US012683196B2

(12) United States Patent
Mohtadi et al.

(10) Patent No.: US 12,683,196 B2
(45) Date of Patent: Jul. 14, 2026

(54) ANODICALLY STABLE AND HIGHLY CONDUCTING BORANE SOLID STATE BATTERY ELECTROLYTES

(71) Applicant: Toyota Motor Engineering & Manufacturing North America, Inc., Plano, TX (US)

(72) Inventors: Rana Mohtadi, Northville, MI (US); Oscar Tutusaus, Ann Arbor, MI (US)

(73) Assignees: Toyota Motor Engineering & Manufacturing North America, Inc., Plano, TX (US); Toyota Jidosha Kabushiki Kaisha, Toyota Aichi-ken (JP)

( * ) Notice: Subject to any disclaimer, the term of this patent is extended or adjusted under 35 U.S.C. 154(b) by 960 days.

(21) Appl. No.: 17/954,687

(22) Filed: Sep. 28, 2022

(65) Prior Publication Data

US 2024/0106007 A1 Mar. 28, 2024

(51) Int. Cl.
*H01M 10/00* (2006.01)
*H01M 10/26* (2006.01)

(52) U.S. Cl.
CPC .... *H01M 10/26* (2013.01); *H01M 2300/0014* (2013.01)

(58) Field of Classification Search
CPC .......... H01M 10/26; H01M 2300/0014; Y02E 60/10
See application file for complete search history.

(56) References Cited

U.S. PATENT DOCUMENTS 10,553,897 B2 2/2020 Udovic
2006/0216612 A1 9/2006 Jambunathan et al.
(Continued)

FOREIGN PATENT DOCUMENTS

CN 110240610 A * 9/2019 .............. C07F 5/022
CN 112018434 A * 12/2020 ........ H01M 10/0565

OTHER PUBLICATIONS

Mao et al., Method For Synthesizing And Optimizing New Soft Material Based On Boron Compound, Dec. 2020, See the Abstract. (Year: 2020).*

(Continued)

*Primary Examiner* — Tiffany Legette
*Assistant Examiner* — Monique M Wills
(74) *Attorney, Agent, or Firm* — Christopher G. Darrow; Darrow Mustafa PC

(57) ABSTRACT

An electrolyte includes a composite salt mixture with a halogenated boron cluster salt. The halogenated boron cluster salt includes a cation selected from $Li^+$, $Na^+$, $Mg^{2+}$, $Ca^{2+}$, $Zn^{2+}$ and $Al^{3+}$, and a halogenated boron cluster anion. The halogenated boron cluster anion has a structure of $[CB_{(y-1)}H_{(y-z-i)}R_zX_i]^-$, $[C_2B_{(y-2)}H_{(y-t-j-1)}R_tX_j]^-$, $[C_2B_{(y-3)}H_{(y-t-j)}R_tX_j]^-$, $[C_2B_{(y-3)}H_{(y-t-j-1)}R_tX_j]^{2-}$, or $[C_2B_{(y-4)}H_{(y-t-j-1)}R_tX_j]^{2-}$, $[CB_{(y-1)}H_{(y-z)}R_z]^-$, $[C_2B_{(y-2)}H_{(y-t-1)}R_t]^-$, $[C_2B_{(y-3)}H_{(y-t)}R_t]^-$, $[C_2B_{(y-3)}H_{(y-t-1)}R_t]^{2-}$, and/or $B_yH_{(y-z-i)}R_zX_i]^{2-}$, where y is an integer within a range of 6 to 12, (z+i) is an integer within a range of 0 to y, (t+j) is an integer within a range of 0 to (y−1), and X is F, Cl, Br, or I. Also, the composite salt mixture can be at least 90 mol % halogenated, for example, at least 90 mol % mono-halogenated or less than 10 mol % mono-halogenated.

20 Claims, 3 Drawing Sheets

(56) References Cited

U.S. PATENT DOCUMENTS

| | | |
|---|---|---|
| 2007/0072085 A1 | 3/2007 | Chen et al. |
| 2016/0372786 A1 | 12/2016 | Udovic, IV |
| 2020/0381776 A1 | 12/2020 | Mohtadi et al. |
| 2020/0381777 A1 | 12/2020 | Mohtadi et al. |
| 2021/0300773 A1 | 9/2021 | Nogami et al. |
| 2021/0408587 A1 | 12/2021 | Mohtadi et al. |

OTHER PUBLICATIONS

Mao et al., A Preparation Method Of Polyol Ester Difluoro Borate, Sep. 2019, See the Abstract. (Year: 2019).*
Tang et al., "Unparalleled lithium and sodium superionic conduction in solid electrolytes with large monovalent cage-like anions," vol. 8, issue 12, Oct. 8, 2015, pp. 3637-3645.

* cited by examiner

ANODICALLY STABLE AND HIGHLY CONDUCTING BORANE SOLID STATE BATTERY ELECTROLYTES

TECHNICAL FIELD

The present disclosure generally relates to electrolytes, and particularly to electrolytes for lithium, sodium, magnesium, calcium, zinc, or aluminum batteries.

BACKGROUND

Solid-state electrolytes provide many advantages in secondary battery design, including mechanical stability, no volatility, and ease of construction. Typical inorganic solid-state electrolytes having high ionic conductivity are sulfides-based electrolytes. For example, Zhang et al. reported that the ionic conductivity for a sulfide electrolyte can exceed 25 mS/cm, which is advantageous for battery applications (Zhang Z et al. Energy Environ. Sci., 2018, 11, 1945). However, sulfide-based electrolytes suffer from the high propensity to form $H_2S$ toxic gases upon exposure to low level of moisture, which challenges their practical use. Other classes such as polymeric and other organic have inferior ionic mobility at technologically relevant temperatures below 60° C.

The present disclosure addresses these issues with solid-state electrolytes, and other issues related to electrolytes.

SUMMARY

In one form of the present disclosure, an electrolyte includes a composite salt mixture with a halogenated boron cluster salt that includes a cation selected from $Li^+$, $Na^+$, $Mg^{2+}$, $Ca^{2+}$, $Zn^{2+}$ or $Al^{3+}$, and a halogenated boron cluster anion. The halogenated boron cluster anion has a structure of $[CB_{(y-1)}H_{(y-z-i)}R_zX_i]^-$, $[C_2B_{(y-2)}H_{(y-t-j-1)}R_tX_j]^-$, $[C_2B_{(y-3)}H_{(y-t-j)}R_tX_j]^-$, $[C_2B_{(y-3)}H_{(y-t-j-1)}R_tX_j]^{2-}$, $[C_2B_{(y-4)}H_{(y-t-j-1)}R_tX_j]^{2-}$, $[CB_{(y-1)}H_{(y-z)}R_z]^-$, $[C_2B_{(y-2)}H_{(y-t-1)}R_t]^-$, $[C_2B_{(y-3)}H_{(y-t)}R_t]^-$, $[C_2B_{(y-3)}H_{(y-t-1)}R_t]^{2-}$, and/or $B_yH_{(y-z-i)}R_zX_i]^{2-}$, where y is an integer within a range of 6 to 12, (z+i) is an integer within a range of 0 to y, (t+j) is an integer within a range of 0 to (y−1), X is F, Cl, Br, or I, and R is: (i) a linear, branched-chain, or cyclic C1-C18 alkyl or fluoroalkyl group, (ii) a C6-C9 aryl or fluoroaryl group, (iii) a linear, branched-chain, or cyclic C1-C8 alkoxy or fluoroalkoxy group, (iv) a C6-C9 aryloxy or fluoroaryloxy group, (v) an amino, or (vi) a substituent that combines two or more of (i)-(v). In some variations, the boron cluster salt includes the cation selected from $Li^+$, $Na^+$, $Mg^{2+}$, $Ca^{2+}$, $Zn^{2+}$ or $Al^{3+}$, and a halogenated closo-borate anion. Also, the composite salt mixture is at least 90 molar (mol) percent (%) halogenated, i.e., at least 90% of the boron cluster anion molecules include at least one halogen atom.

In another form of the present disclosure, an electrolyte includes a composite salt mixture with a halogenated boron cluster salt that includes a cation selected from $Li^+$, $Na^+$, $Mg^{2+}$, $Ca^{2+}$, $Zn^{2+}$, and/or $Al^{3+}$, and a halogenated boron cluster anion. The halogenated boron cluster anion has a structure of $[CB_{(y-1)}H_{(y-z-i)}R_zX_i]^-$, $[C_2B_{(y-2)}H_{(y-t-j-1)}R_tX_j]^-$, $[C_2B_{(y-3)}H_{(y-t-j)}R_tX_j]^-$, $[C_2B_{(y-3)}H_{(y-t-j-1)}R_tX_j]^{2-}$, $[C_2B_{(y-4)}H_{(y-t-j-1)}R_tX_j]^{2-}$, $[CB_{(y-1)}H_{(y-z)}R_z]^-$, $[C_2B_{(y-2)}H_{(y-t-1)}R_t]^-$, $[C_2B_{(y-3)}H_{(y-t)}R_t]^-$, $[C_2B_{(y-3)}H_{(y-t-1)}R_t]^{2-}$, and/or $B_yH_{(y-z-i)}R_zX_i]^{2-}$, where y is an integer within a range of 6 to 12, (z+i) is an integer within a range of 0 to y, (t+j) is an integer within a range of 0 to (y−1), X is F, Cl, Br, or I at any available B—H and C—H positions of the halogenated boron cluster anion structure, and R is: (i) a linear, branched-chain, or cyclic C1-C18 alkyl or fluoroalkyl group, (ii) a C6-C9 aryl or fluoroaryl group, (iii) a linear, branched-chain, or cyclic C1-C8 alkoxy or fluoroalkoxy group, (iv) a C6-C9 aryloxy or fluoroaryloxy group, (v) an amino, or (vi) a substituent that combines two or more of (i)-(v). Also, the composite salt mixture is at least 90 mol % mono-halogenated.

In still another form of the present disclosure, an electrochemical cell includes an anode, a cathode, and an electrolyte with a composite salt mixture with a halogenated boron cluster salt that includes a cation selected from $Li^+$, $Na^+$ and/or $Mg^{2+}$, and a halogenated boron cluster anion. The anode is an alkaline anode, an alkaline earth anode, an insertion type anode, a conversion type anode, or an organic type anode, and the cathode is a metal halide cathode, an air cathode, an organic type cathode, an insertion type cathode, or a conversion type cathode. The halogenated boron cluster anion has a structure of $[CB_{(y-1)}H_{(y-z-i)}R_zX_i]^-$, $[C_2B_{(y-2)}H_{(y-t-j-1)}R_tX_j]^-$, $[C_2B_{(y-3)}H_{(y-t-j)}R_tX_j]^-$, $[C_2B_{(y-3)}H_{(y-t-j-1)}R_tX_j]^{2-}$, $[CB_{(y-1)}H_{(y-z)}R_z]^-$, $[C_2B_{(y-2)}H_{(y-t-1)}R_t]^-$, $[C_2B_{(y-3)}H_{(y-t)}R_t]^-$, $[C_2B_{(y-3)}H_{(y-t-1)}R_t]^{2-}$, and/or $B_yH_{(y-z-i)}R_zX_i]^{2-}$, where y is an integer within a range of 6 to 12, (z+i) is an integer within a range of 0 to y, (t+j) is an integer within a range of 0 to (y−1), X is F or Cl at an antipodal B—H position of the halogenated boron cluster anion structure, and R is: (i) a linear, branched-chain, or cyclic C1-C18 alkyl or fluoroalkyl group, (ii) a C6-C9 aryl or fluoroaryl group, (iii) a linear, branched-chain, or cyclic C1-C8 alkoxy or fluoroalkoxy group, (iv) a C6-C9 aryloxy or fluoroaryloxy group, (v) an amino, or (vi) a substituent that combines two or more of (i)-(v). Also, the composite salt mixture is less than 10 mol % mono-halogenated.

These and other features of the composite salt mixture and its preparation will become apparent from the following detailed description when read in conjunction with the figures and examples, which are exemplary, not limiting.

BRIEF DESCRIPTION OF THE DRAWINGS

The present teachings will become more fully understood from the detailed description and the accompanying drawings, wherein.

Figure 1A:
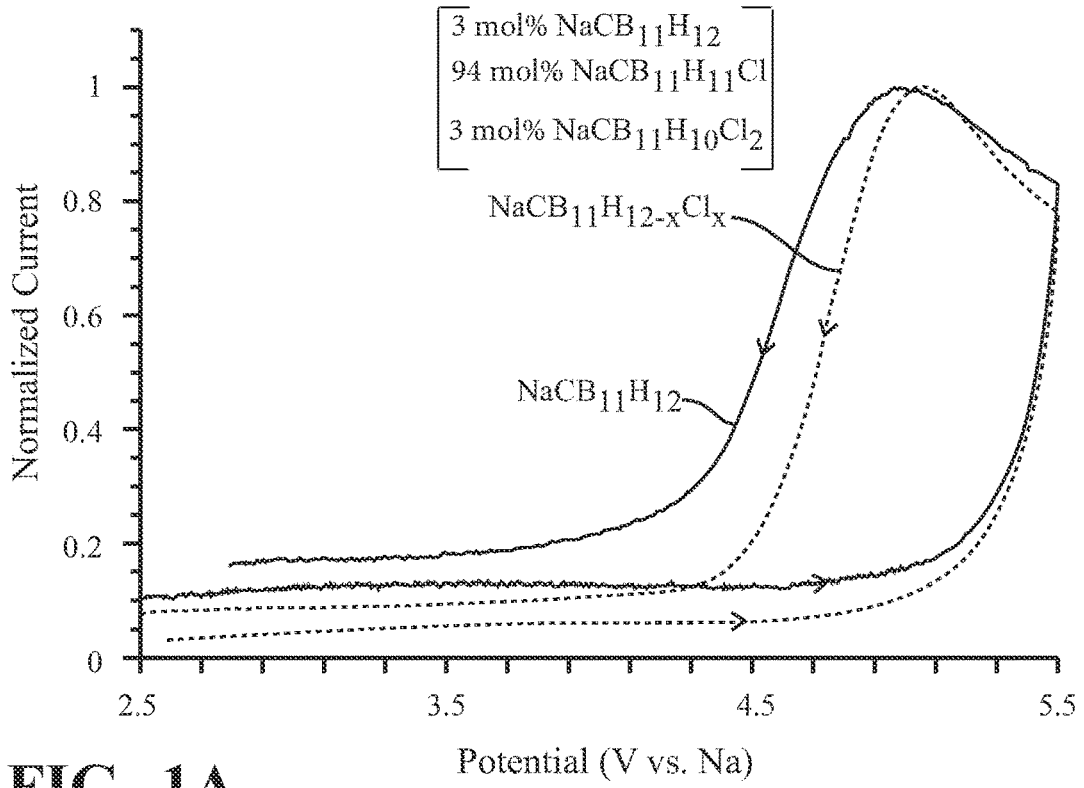
FIG. 1A is a plot of normalized current versus potential for a halogenated boron cluster salt according to the teachings of the present disclosure and a parent halogen-free boron cluster salt.

It should be noted that the figures set forth herein are intended to exemplify the general characteristics of the composite salt mixtures and electrolytes of the present technology, for the purpose of the description of certain aspects. The figures may not precisely reflect the characteristics of any given aspect and are not necessarily intended to define or limit specific forms or variations within the scope of this technology.

DETAILED DESCRIPTION

The present disclosure provides electrolytes and electrochemical cells that electrolytes that include a halogenated boron cluster salt with a cation selected from $Li^+$, $Na^+$, $Mg^{2+}$, $Ca^{2+}$, $Zn^{2+}$ and $Al^{3+}$, and a halogenated boron cluster anion where at least one of the cluster B—H or C—H groups is replaced by a B—X or C—X group(s), respectively, where X is a halogen. That is, in some variations X is directly bonded to a boron cluster atom or a carbon cluster atom of the halogenated boron cluster anion structure. The halogenated boron cluster salt exhibits enhanced anodic stability compared to a parent halogen-free boron cluster salt while maintaining acceptable cationic conductivity compared to the parent halogen-free boron cluster salt. As used herein, the phrase "parent halogen free boron cluster salt" refers to a halogen free boron cluster salt with the same cation and a boron cluster anion having the same number of carbon atoms and boron atoms as the halogenated boron cluster salt. In some variations, an electrochemical cell with an electrolyte according to the teachings of the present disclosure includes an alkaline anode, an alkaline earth anode, an insertion type anode, a conversion type anode, and an organic type anode. And in at least one variation, an electrochemical cell with an electrolyte according to the teachings of the present disclosure includes a metal halide cathode, an air cathode, an organic type cathode, an insertion type cathode, or a conversion type cathode.

In some variations of the present disclosure, an electrolyte includes a halogenated boron cluster salt with a cation selected from $Li^+$, $Na^+$, $Mg^{2+}$, $Ca^{2+}$, $Zn^{2+}$ and $Al^{3+}$, and a halogenated boron cluster anion with the structure $[CB_{(y-1)}H_{(y-z-i)}R_zX_i]^-$, $[C_2B_{(y-2)}H_{(y-t-j-1)}R_tX_j]^-$, $[C_2B_{(y-3)}H_{(y-t-j)}R_tX_j]^-$, $[C_2B_{(y-3)}H_{(y-t-j-1)}R_tX_j]^{2-}$, $[C_2B_{(y-4)}H_{(y-t-j-1)}R_tX_j]^{2-}$, $[CB_{(y-1)}H_{(y-z)}R_z]^-$, $[C_2B_{(y-2)}H_{(y-t-1)}R_t]^-$, $[C_2B_{(y-3)}H_{(y-t)}R_t]^-$, $[C_2B_{(y-3)}H_{(y-t-1)}R_t]^{2-}$, and/or $B_yH_{(y-z-i)}R_zX_i]^{2-}$, and where X is F, Cl, Br, or I, and R is: (i) a linear, branched-chain, or cyclic C1-C18 alkyl or fluoroalkyl group, (ii) a C6-C9 aryl or fluoroaryl group, (iii) a linear, branched-chain, or cyclic C1-C8 alkoxy or fluoroalkoxy group, (iv) a C6-C9 aryloxy or fluoroaryloxy group, (v) an amino, or (vi) a substituent that combines two or more of (i)-(v). Also, y is an integer within a range of 6 to 12, (z+i) is an integer within a range of 0 to y, and (t+j) is an integer within a range of 0 to (y−1). For example, in some variations the boron cluster anion of the halogenated boron cluster salt is $[CB_{11}H_{11}X]^-$, $[CB_{11}H_{10}X_2]^-$, $[CB_{11}H_9X_3]^-$, or $[CB_{11}H_8X_4]^-$. Accordingly, in at least one variation the electrolyte does not include a monomer and/or a polymer, i.e., the electrolyte is a non-polymer electrolyte.

It should be understood that the boron cluster anions such as the closo-borates anions $CB_{11}H_{12}^-$ and $CB_9H_{10}^-$, are attractive for solid-state batteries because such anions display orientation mobility and a dynamic frustration that allows order-disorder phase transitions, which in turn leads to high cation mobility for enhanced ion conduction. In addition, in at least one variation the halogenated boron cluster anion will include flexible and/or asymmetrical substituents, i.e., the halogenated boron cluster anion will be asymmetric with respect to the size and distribution of substituents, and such asymmetry results in or provides enhanced conductivity of the composite salt mixtures described herein. As used herein, the phrase "composite salt mixture" refers to a salt mixture that includes a halogenated boron cluster anion and an alkali metal, alkaline-earth metal, transition metal, and/or metal cation.

In some variations, the electrolyte is a composite salt mixture that is at least 90% mono-halogenated. And in such variations, the composite salt mixture can be at least greater than 0% and less than or equal to 10% non-halogenated (i.e., the composite salt mixture has a composition with greater than 0% and less than or equal to 10% of a non-halogenated boron cluster salt), greater than 0% and less than or equal to 10% di-halogenated, greater than 0% and less than or equal to 10% tri-halogenated, and/or greater than 0% and less than or equal to 10% quadruple halogenated.

In other variations, the electrolyte is a composite salt mixture that is less than 10% mono-halogenated. For example, in some variations the composite salt mixture is between 30% and 60% di-halogenated and between 30% and 60% tri-halogenated. And in at least one variation, the electrolyte is between 40% and 60% di-halogenated and between 40% and 60% tri-halogenated. Also, in such variations the composite salt mixture can be less than 10% non-halogenated and less than 10% quadruple halogenated.

In some variations, the cation of the mono-halogenated boron cluster salt (when present) is the same as the cation of the di-halogenated boron cluster salt (when present), the cation of the tri-halogenated boron cluster salt (when present), the cation of the quadruple halogenated boron cluster salt (when present) and/or the cation of the non-halogenated boron cluster salt (when present). In other variations, the cation of the mono-halogenated boron cluster salt is different from the cation of the di-halogenated boron cluster salt (when present), the cation of the tri-halogenated boron cluster salt (when present), the cation of the quadruple halogenated boron cluster salt (when present) and/or the cation of the non-halogenated boron cluster salt (when present).

In at least one variation, the cation of the di-halogenated boron cluster salt (when present) is the same as the cation of the tri-halogenated boron cluster salt (when present), the cation of the quadruple halogenated boron cluster salt (when present) and/or the cation of the non-halogenated boron cluster salt (when present), while in other variations the cation of the di-halogenated boron cluster salt (when present) is different than the cation of the tri-halogenated boron cluster salt (when present), the cation of the quadruple halogenated boron cluster salt (when present) and/or the cation of the non-halogenated boron cluster salt (when present).

In some variations, the cation of the tri-halogenated boron cluster salt (when present) is the same as the cation of the quadruple halogenated boron cluster salt (when present) and/or the cation of the non-halogenated boron cluster salt (when present), while in other variations the cation of the tri-halogenated boron cluster salt (when present) is different than the cation of the quadruple halogenated boron cluster salt (when present) and/or the cation of the non-halogenated boron cluster salt (when present). And in at least one variation the cation of the quadruple halogenated boron cluster salt (when present) is the same as the cation of the non-halogenated boron cluster salt (when present), while in other variations the cation of the quadruple halogenated boron cluster salt (when present) is different from the cation of the non-halogenated boron cluster salt (when present).

In addition to the above, in some variations the boron cluster anion of the mono-halogenated boron cluster salt (when present) is the same as the boron cluster anion of the di-halogenated boron cluster salt (when present and except for the halogenation), the boron cluster anion of the tri-halogenated boron cluster salt (when present and except for the halogenation), the boron cluster anion of the quadruple halogenated boron cluster salt (when present and except for the halogenation) and/or the boron cluster anion of the non-halogenated boron cluster salt (when present and except for the halogenation). In other variations, the boron cluster anion of the mono-halogenated boron cluster salt (when present) is different from the boron cluster anion of the di-halogenated boron cluster salt (when present), the boron cluster anion of the tri-halogenated boron cluster salt (when present), the boron cluster anion of the quadruple halogenated boron cluster salt (when present) and/or the boron cluster anion of the non-halogenated boron cluster salt (when present).

In at least one variation, the boron cluster anion of the di-halogenated boron cluster salt (when present) is the same as the boron cluster anion of the tri-halogenated boron cluster salt (when present and except for the halogenation), the boron cluster anion of the quadruple halogenated boron cluster salt (when present and except for the halogenation) and/or the boron cluster anion of the non-halogenated boron cluster salt (when present and except for the halogenation), while in other variations the boron cluster anion of the di-halogenated boron cluster salt (when present) is not the same as the boron cluster anion of the tri-halogenated boron cluster salt (when present), the boron cluster anion of the quadruple halogenated boron cluster salt (when present) and/or the boron cluster anion of the non-halogenated boron cluster salt (when present).

In some variations, the boron cluster anion of the tri-halogenated boron cluster salt (when present) is the same as the boron cluster anion of the quadruple halogenated boron cluster salt (when present and except for the halogenation) and/or the boron cluster anion of the non-halogenated boron cluster salt (when present and except for the halogenation), while in other variations the boron cluster anion of the tri-halogenated boron cluster salt (when present) is different than the boron cluster anion of the quadruple halogenated boron cluster salt (when present) and/or the boron cluster anion of the non-halogenated boron cluster salt (when present). And in at least one variation, the boron cluster anion of the quadruple halogenated boron cluster salt (when present) is the same as the boron cluster anion of the non-halogenated boron cluster salt (when present), while in other variations the boron cluster anion of the quadruple halogenated boron cluster salt (when present) is different from the boron cluster anion of the non-halogenated boron cluster salt (when present).

Accordingly, an electrolyte formulation with the composite salt mixture according to the teachings of the present disclosure can include the same or multiple different cations and the same or multiple boron cluster anions.

In some variations, an electrolyte with the composite salt mixture can include one or more additional cation conductivity enhancing anions. The mole fraction of the one or more additional conductivity enhancing anion to the total anions in the composite salt mixture can be from about 0.01 to about 0.9. Also, the one or more additional conductivity enhancing anions can be selected from $F^-$, $Cl^-$, $Br^-$, $I^-$, $BH_4^-$, $R_xBF_{4-x}^-$, $R_yPF_{6-y}^-$, $SbF_6^-$, $ClO_4^-$, $SO_4^{-2}$, $N(SO_2F)_2^-$, $N(SO_2(CF_2)_nCF_3)_2^-$, $[NSO_2(CF_2)_{n+1}SO_2]^-$, or $CF_3(CF_2)_nSO_3^-$, where: n is 0 to 5; x is 0 to 4; y is 0 to 6; and R is a linear, branched, or cyclic alkyl group that can be unsubstituted, partially fluorinated, or fully fluorinated.

In at least one variation, an electrolyte is formulated from the composite salt mixture with an addition of an organic plastic crystal such that a soft solid electrolyte with appreciable cation conductivity(ies) is provided. The organic plastic crystal material can be a succinonitrile-glutaronitrile mixture where the mole percent of glutaronitrile is 15 to 96 mole % and the plastic state (i.e., the organic plastic crystal) promotes cation conductivities of more than $10^{-7}$ S/cm at 60° C. And in some variations, the electrolyte includes the combined halogen-free boron cluster/halogenated boron cluster salt, the organic plastic crystal, and the one or more additional cation conductivity enhancing anions.

In one form of the present disclosure, the composite salt mixture is included in a solid-state electrolyte for a solid-state electrochemical device. In another form of the present disclosure, an electrolyte with the composite salt mixture is in a partially liquid molten state at room temperature (i.e., 20-25° C.). And in still another form, an electrolyte with the composite salt mixture is in a fully liquid molten state at room temperature.

In some variations, a composite salt mixture is prepared by combining or mixing appropriate amounts of non-halogenated salt(s), mono-halogenated salt(s), di-halogenate salts(s), tri-halogenated salt(s), and/or quadruple halogenated salt(s) using mechanochemical synthetic ball milling followed by an optional heat treatment of the ball milled material at temperatures less than 200° C. and an optional ball milling homogenization step. In other variations, a composite salt mixture is prepared using solution-based synthesis in which appropriate amounts of non-halogenated salt(s), mono-halogenated salt(s), tri-halogenated salt(s), and/or quadruple halogenated salt(s) are dissolved in a solvent (e.g., an ether solvent) followed by a solvent removal step and an optional ball milling homogenization step.

In some variations, an electrochemical device that includes an anode, a cathode, and an electrolyte with the composite salt mixture is provided in the present disclosure. The electrochemical device can be a secondary battery or a subunit of a secondary battery. The anode is an electrode where insertion host material such as graphite or lithium titanate, alkali metal, alkali earth metal, transition metal, and/or metal oxidation occurs during the device's discharge and where reduction occurs during the device's charge. Similarly, the cathode is an electrode where a cathode material reduction occurs during the device's discharge and a cathode material oxidation occurs during the device's charge.

Figure 1B:
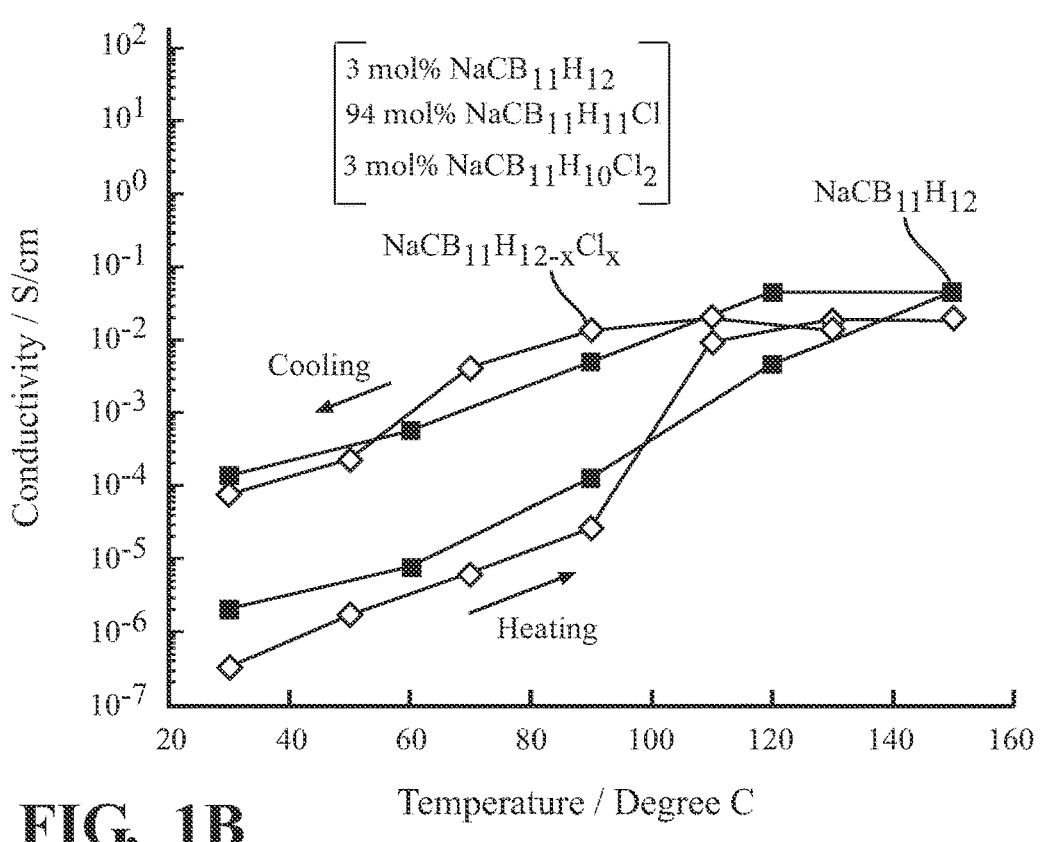
FIG. 1B is a plot of conductivity versus temperature for the halogenated boron cluster salt and the parent halogen-free boron cluster salt in FIG. 1A.

Referring now to FIGS. 1A and 1B, a plot of normalized current versus potential for a composite salt mixture according to the teachings of the present disclosure (labeled "$NaCB_{11}H_{12-x}Cl_x$") and a parent halogen-free boron cluster salt (labeled "$NaCB_{11}H_{12}$") is shown in FIG. 1A, and a plot of conductivity versus temperature for the composite salt mixture $NaCB_{11}H_{12-x}Cl_x$ and the parent halogen-free boron cluster salt $NaCB_{11}H_{12}$ is shown in FIG. 1B. The composite salt mixture $NaCB_{11}H_{12-x}Cl_x$ had a composition of 3 mol % $NaCB_{11}H_{12}$, 94 mol % $NaCB_{11}H_{11}Cl$, and 3 mol % $NaCB_{11}H_{10}Cl_2$ as shown in the legend in FIGS. 1A-1B, and was synthesized from $CsCB_{11}H_{12}$ according to the process explained in Example 1 below.

Referring particularly to FIG. 1A, current was measured as a function of potential applied to an electrochemical cell with the composite salt mixture $NaCB_{11}H_{12-x}Cl_x$ and an electrochemical cell with the parent halogen-free boron cluster salt $NaCB_{11}H_{12}$. And as observed from FIG. 1A, the composite salt mixture $NaCB_{11}H_{12-x}Cl_x$ exhibited about a 0.15 V improvement in anodic stability compared to the parent halogen-free boron cluster salt $NaCB_{11}H_{12}$ at 80% of peak normalized current (after peak current was reached), about 0.17 V improvement compared to the parent halogen-free boron cluster salt $NaCB_{11}H_{12}$ at 60% of peak normalized current, about 0.25 V improvement compared to the parent halogen-free boron cluster salt $NaCB_{11}H_{12}$ at 40% of peak normalized current, and about 0.67 V improvement compared to the parent halogen-free boron cluster salt $NaCB_{11}H_{12}$ at 20% of peak normalized current. In addition, the composite salt mixture $NaCB_{11}H_{12-x}Cl_x$ exhibited about a 0.24 V improvement in anodic stability compared to the parent halogen-free boron cluster salt $NaCB_{11}H_{12}$ when measured at the base level, i.e., when measured at the intercept of the slope of the baseline and the slope of the current increase (after peak current was reached).

In addition, FIG. 1B illustrates the cationic conductivity of the composite salt mixture $NaCB_{11}H_{12-x}Cl_x$ (after cooling) was within the same order of magnitude as the parent halogen-free boron cluster salt $NaCB_{11}H_{12}$. Accordingly, it should be understood that the composite salt mixture $NaCB_{11}H_{12-x}Cl_x$; exhibited enhanced anodic stability while maintaining acceptable cationic conductivity in the presence of non-halogenated boranes.

Figure 2:
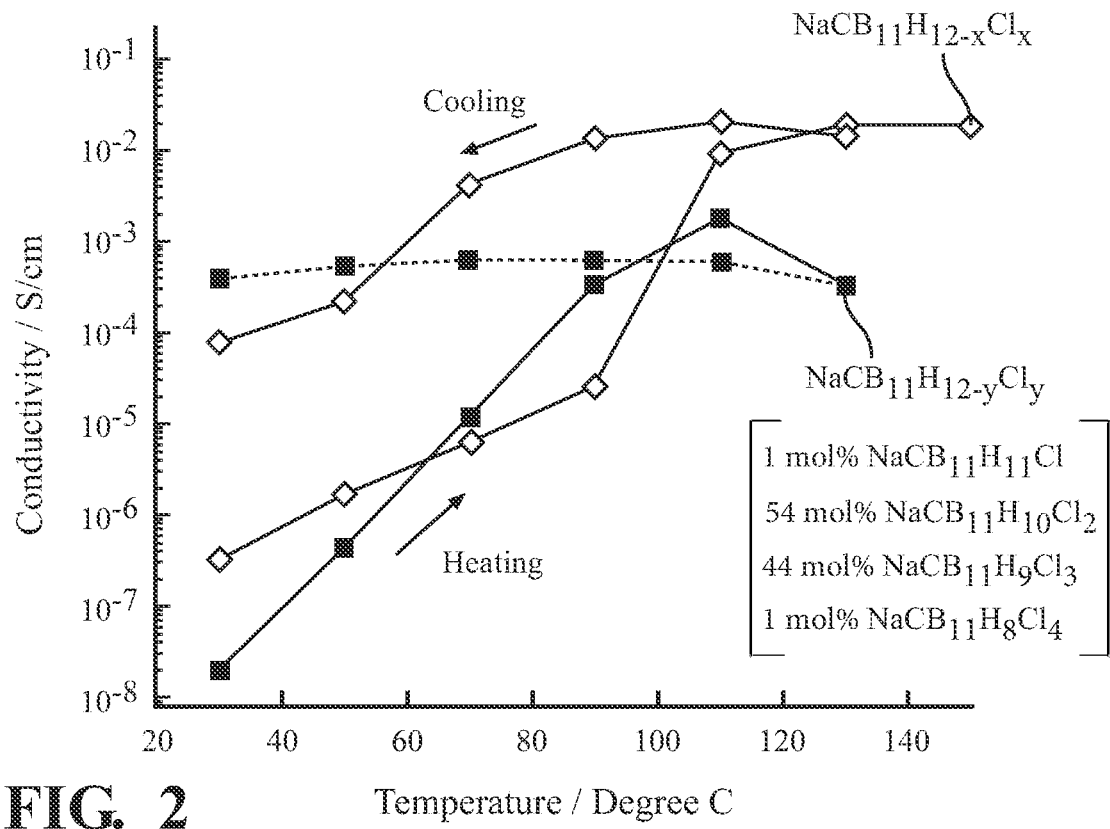
FIG. 2 is a plot of conductivity versus temperature for the halogenated boron cluster salt in FIG. 1A and another halogenated boron cluster salt according to the teachings of the present disclosure.

Referring to FIG. 2, a plot of conductivity versus temperature for the composite salt mixture $NaCB_{11}H_{12-x}Cl_x$ and another composite salt mixture (labeled "$NaCB_{11}H_{12-y}Cl_y$") is shown. The composite salt mixture $NaCB_{11}H_{12-y}Cl_y$ had a composition of 0 mol % $NaCB_{11}H_{12}$, 1 mol % $NaCB_{11}H_{11}Cl$, 54 mol % $NaCB_{11}H_{10}Cl_2$, 44% mol $NaCB_{11}H_9Cl_3$, and 1% mol $NaCB_{11}H_8Cl_4$, and was synthesized according to the process explained in Example 2 below. And as observed from FIG. 2, the composite salt mixture $NaCB_{11}H_{12-y}Cl_y$ exhibited enhanced cationic conductivity compared to the composite salt mixture $NaCB_{11}H_{12-x}Cl_x$; (and the parent halogen-free boron cluster salt $NaCB_{11}H_{12}$ see FIG. 1A) following heat treatment of the two composite salt mixtures.

Figure 3:
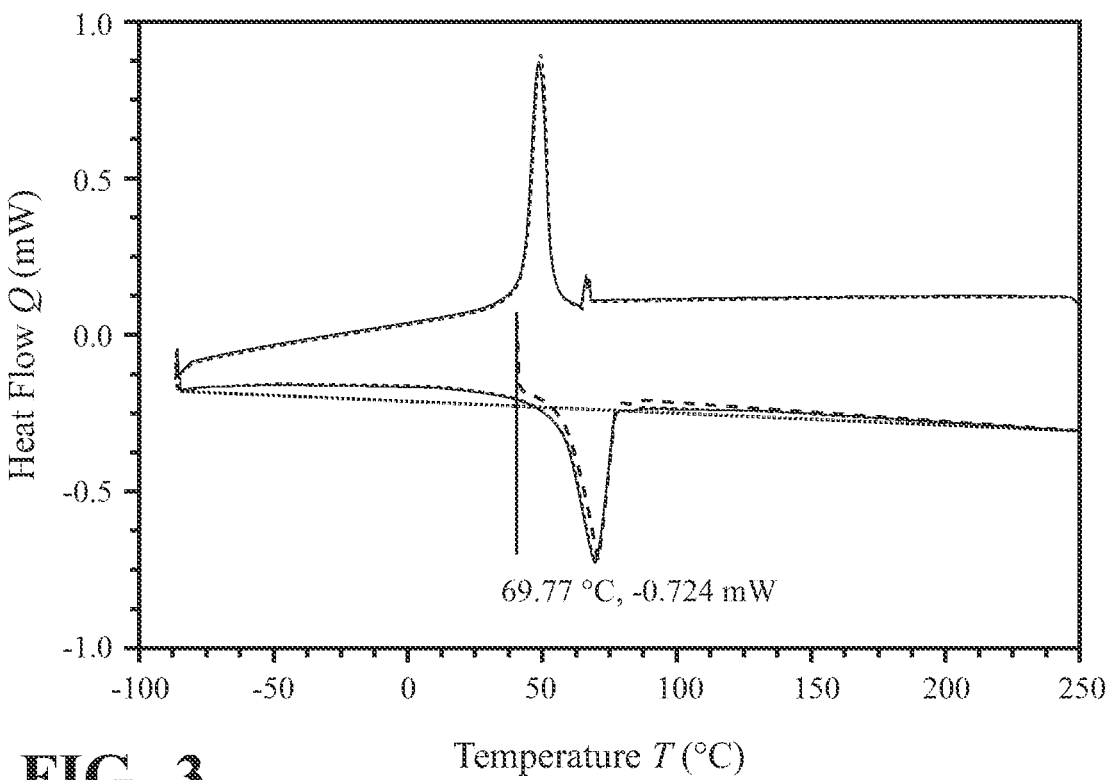
FIG. 3 is a plot of heat flow versus temperature for a differential scanning calorimetry analysis of still another halogenated boron cluster salt according to the teachings of the present disclosure.
Figure 4:
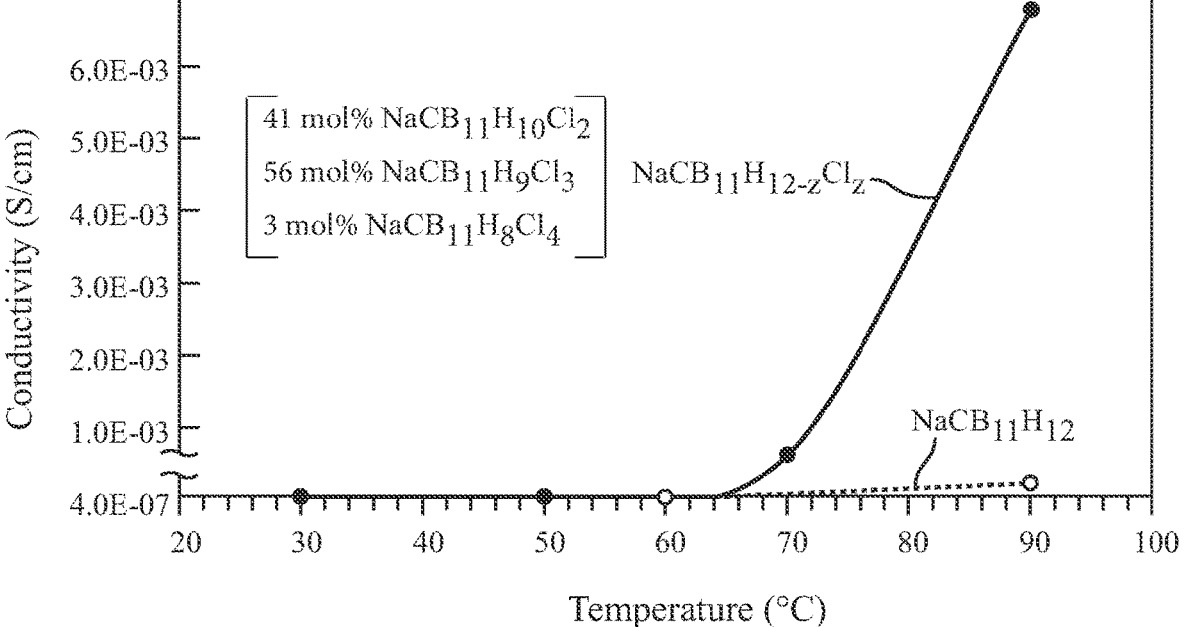
FIG. 4 is a plot of conductivity versus temperature for the halogenated boron cluster salt in FIG. 3 and a parent halogen-free boron cluster salt.

Referring to FIGS. 3 and 4, a plot of heat flow versus temperature for a differential scanning calorimetry analysis of a still another composite salt mixture (labeled "$NaCB_{11}H_{12-z}Cl_z$" in FIG. 4) according to the teachings of the present disclosure is shown in FIG. 3, and a plot of conductivity versus temperature for the composite salt mixture $NaCB_{11}H_{12-z}Cl_z$ and for the parent halogen-free boron cluster salt $NaCB_{11}H_{12}$ is shown in FIG. 4. The composite salt mixture $NaCB_{11}H_{12-z}Cl_z$ had a composition of 0 mol % $NaCB_{11}H_{12}$, 0 mol % $NaCB_{11}H_{11}Cl$, 41 mol % $NaCB_{11}H_{10}Cl_2$, 56% mol $NaCB_{11}H_9Cl_3$, and 3% mol $NaCB_{11}H_8Cl_4$, and was synthesized according to the process explained in Example 3 below. And as observed from FIG. 3, the composite salt mixture $NaCB_{11}H_{12-z}Cl_z$ exhibited a reversible endothermic transition at about 70° C. In contrast, the parent halogen-free boron cluster salt $NaCB_{11}H_{12}$ exhibits a reversible endothermic transition at greater than 100° C. (not shown).

Referring particularly to FIG. 4, the reversible endothermic transition of the composite salt mixture $NaCB_{11}H_{12-z}Cl_z$ at about 70° C. results in or leads to formation of superionic conducting phase. That is, in some variations, composite salt mixtures and/or halogenated boron cluster salts according to the teachings of the present disclosure have or exhibit a phase transition temperature between a non-superionic conducting phase and a superionic conducting phase that is at a lower temperature than a non-superionic conducting phase to superionic conducting phase transition temperature for corresponding parent halogen-free boron cluster salts. In at least one variation, the phase transition temperature of the halogenated boron cluster salt(s) is at least 20° C. less than the non-superionic conducting phase to superionic conducting phase transition temperature of the parent halogen-free boron cluster salt(s). And in some variations, the phase transition temperature for the halogenated boron cluster salt(s) is at least 30° C. less than the non-superionic conducting phase to superionic conducting phase transition temperature of the parent halogen-free boron cluster salt(s).

Example 1. Synthesis of $NaCB_{11}H_{12-x}Cl_x$ salt in FIG. 1: $CsCB_{11}H_{12}$ (1.0 g, 3.62 mmol) and N-chlorosuccinimide (508.8 mg, 3.81 mmol) were added to anhydrous THF (20 mL) and the mixture stirred at 50° C. for 7 hours. The solvent was removed under vacuum at 40° C. and the resulting white solid was washed with $CH_2Cl_2$ (10 mL). It was then extracted with 10 mL of warm water and the solution was filtered to remove debris. The volume of the filtrate was reduced to half using rotary evaporation. The mixture was heated to 50° C. and the resulting solution was then stored at room temperature overnight to crystallize. Supernatant was removed and the remaining crystals were washed with cold (4° C.) water and dried under vacuum to yield 565 mg of a white solid. The corresponding $Na^+$ salt was obtained via passage of an aqueous solution of the former solid through a cation exchange resin ($Na^+$ form), followed by water removal from the eluant via rotary evaporation and drying at 200° C. for 24 hours. Nuclear Magnetic Resonance (NMR) analysis is consistent with a mixture of 3 mol % $NaCB_{11}H_{12}$, 94 mol % of $NaCB_{11}H_{11}Cl$ and 3 mol % of $NaCB_{11}H_{10}Cl_2$.

Example 2. Synthesis of $NaCB_{11}H_{12-y}Cl_y$ salt in FIG. 2: $CsCB_{11}H_{12}$ (554.0 g, 2.01 mmol) and N-chlorosuccinimide (809.2 mg, 6.06 mmol) were added aqueous HCl (10%, 10 mL) and the suspension was stirred at room temperature for 1 hour. The solution was neutralized by the slow addition of solid $K_2CO_3$ (4 g required) and methanol (2 mL) was added to the resulting suspension. Addition of a solution of $NEt_4Cl\cdot HCl$ (570 mg, 3.1 mmol) in $MeOH/H_2O$ (1:10, 2.2 mL) yielded a suspension. The white solid was collected by filtration, washed with $MeOH/H_2O$ (1:10, 2×5 mL), then with $H_2O$ (2×5 mL) and with hexane (2×5 mL). Solid was dissolved in a mixture of aqueous HCl (15%, 25 mL) and $Et_2O$ (25 mL). The organic phase was collected and the aqueous phase was extracted with additional $Et_2O$ (2×25 mL). All organic phases were combined and the total volume was reduced to 25 mL using a rotary evaporator. The $Et_2O$ solution was washed with 25 mL of an aqueous solution of CsCl (10%) and $Cs_2CO_3$ (2%), the organic phase was collected and the remaining aqueous phase was extracted with $Et_2O$ (2×25 mL). All the organic phases were combined, dried with $Na_2SO_4$ and solvent was removed to obtain a white solid. The solid was dried at 100° C. under vacuum for 15 minutes, then extracted with cold $Et_2O$ (35 mL) and the hazy mixture was filtered to remove undissolved solid. The solvent was removed under vacuum at 60° C. and the resulting white solid was washed with $CH_2Cl_2$ (25 mL). It was then extracted with 10 mL of warm water and the solution was filtered to remove debris. The volume of the filtrate was reduced to half using rotary evaporation. The mixture heated to 50° C. and the resulting solution was then stored at room temperature overnight to crystallize. Supernatant was removed, crystals were washed with cold (4° C.) water and dried under vacuum to yield 483 mg of a white solid. The corresponding $Na^+$ salt was obtained via passage of an aqueous solution of the former solid through a cation exchange resin (Na$^+$ form), followed by water removal from the eluant via rotary evaporation and drying at 200° C. for 24 hours. NMR analysis was consistent with a mixture of 1 mol % NaCB$_{11}$H$_{11}$Cl, 54 mol % of NaCB$_{11}$H$_{10}$Cl$_2$, 44 mol % of NaCB$_{11}$H$_9$Cl$_3$ and 1 mol % of NaCB$_{11}$H$_8$Cl$_4$.

Example 3. Synthesis of NaCB$_{11}$H$_{12-z}$Cl$_z$ salt in FIG. 4: CsCB$_{11}$H$_{12}$ (3.329 g, 12.07 mmol) and N-chlorosuccinimide (4.837 mg, 36.22 mmol) were added aqueous HCl (10%, 120 mL) and the suspension was stirred at room temperature for 1.5 hours. The solution was neutralized by the slow addition of solid K$_2$CO$_3$ (32 g required) and methanol (12 mL) was added to the resulting suspension. Addition of a solution of NEt$_4$Cl·HCl (3.334 mg, 18.15 mmol) in MeOH/H$_2$O (1:10, 6.6 mL) yields a suspension. The white solid was collected by filtration, washed with cold (4° C.) MeOH/H$_2$O (1:10, 2×50 mL), then with cold (4° C.) H$_2$O (2×50 mL) and with hexane (2×50 mL). Solid was dissolved in a mixture of aqueous HCl (15%, 50 mL) and Et$_2$O (50 mL). The organic phase was collected and the aqueous phase was extracted with additional Et$_2$O (2×50 mL). All organic phases were combined and the total volume was reduced to 50 mL using a rotary evaporator. The Et$_2$O solution was shaken with 50 mL of an aqueous solution of CsCl (10%) and Cs$_2$CO$_3$ (6%), the organic phase was collected and the remaining aqueous phase was extracted with Et$_2$O (2×50 mL). All the organic phases were combined, dried with Na$_2$SO$_4$ and solvent was removed to obtain a white solid. The solid was dried at 100° C. under vacuum for 15 minutes, then extracted with cold Et$_2$O (20 mL) and the hazy mixture was filtered to remove undissolved solid. The solvent was removed under vacuum at 60° C. and the resulting white solid was washed with CH$_2$Cl$_2$ (50 mL). It was then extracted with 90 mL of hot (50° C.) water and the solution was filtered to remove debris. The corresponding Na$^+$ salt was obtained via passage of the later aqueous solution through a cation exchange resin (Na$^+$ form), followed by water removal from the eluant via rotary evaporation and drying at 200° C. for 24 hours to obtain 1.92 g of a white solid with composition 41 mol % of NaCB$_{11}$H$_{10}$Cl$_2$, 56 mol % of NaCB$_{11}$H$_9$Cl$_3$, and 3 mol % of NaCB$_{11}$H$_8$Cl$_4$ based on NMR analysis.

It should be understood from FIGS. 1-4 that composite salt mixtures and/or halogenated boron cluster salts according to the teachings of the present disclosure have or exhibit enhanced anodic stability and comparable or acceptable cationic conductivity compared to parent halogen free boron cluster salts. In addition, in some variations composite salt mixtures and/or halogenated boron cluster salts according to the teachings of the present disclosure exhibit a reversible endothermic transition during heating at temperatures below or less than temperatures of parent halogen free boron cluster salts. And in at least one variation, a reversible endothermic transition of the halogenated boron cluster salts results in formation of a superionic conducting phase.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple forms or variations having stated features is not intended to exclude other forms or variations having additional features, or other forms or variations incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with a form or variation is included in at least one form or variation. The appearances of the phrase "in one variation" or "in one form" (or variations thereof) are not necessarily referring to the same form or variation. It should be also understood that the various method steps discussed herein do not have to be carried out in the same order as depicted, and not each method step is required in each form or variation.

The foregoing description of the forms or variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

While particular forms or variations have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. An electrolyte comprising:
a composite salt mixture comprising:
　a plurality of boron cluster salts comprising a halogenated boron cluster salt with a cation and a halogenated boron cluster anion, the cation selected from the group consisting of $Li^+$, $Na^+$, $Mg^{2+}$, $Ca^{2+}$, $Zn^{2+}$ and $Al^{3+}$, and the halogenated boron cluster anion having a structure of:

$[CB_{(y-1)}H_{(y-z-i)}R_zX_i]^-$, $[C_2B_{(y-2)}H_{(y-t-j-1)}R_tX_j]^-$, $[C_2B_{(y-3)}H_{(y-t-j)}R_tX_j]^-$, $[C_2B_{(y-3)}H_{(y-t-j-1)}R_tX_j]^{2-}$, $[C_2B_{(y-4)}H_{(y-t-j-1)}R_tX_j]^{2-}$, $[CB_{(y-1)}H_{(y-z)}R_z]^-$, $[C_2B_{(y-2)}H_{(y-t-1)}R_t]^-$, $[C_2B_{(y-3)}H_{(y-t)}R_t]^-$, $[C_2B_{(y-3)}H_{(y-t-1)}R_t]^{2-}$, and/or $B_yH_{(y-z-i)}R_zX_i]^{2-}$, wherein:
　y is an integer within a range of 6 to 12;
　(z+i) is an integer within a range of 0 to y;
　(t+j) is an integer within a range of 0 to (y−1);
　X is F, Cl, Br, or I; and
　R is:
　　(i) a linear, branched-chain, or cyclic C1-C18 alkyl or fluoroalkyl group;
　　(ii) a C6-C9 aryl or fluoroaryl group;
　　(iii) a linear, branched-chain, or cyclic C1-C8 alkoxy or fluoroalkoxy group;
　　(iv) a C6-C9 aryloxy or fluoroaryloxy group;
　　(v) amino; and
　　(vi) a substituent that combines two or more of (i)-(v);
wherein at least 90 mol % of the boron cluster salts comprise a halogen atom.

2. The electrolyte according to claim 1, wherein X is directly bonded to a boron cluster atom or carbon cluster atom of the halogenated boron cluster anion structure.

3. The electrolyte according to claim 1, wherein at least 90 mol % of the boron cluster salts comprise a single halogen atom.

4. The electrolyte according to claim 3, wherein at least 1 mol % of the boron cluster salts comprise two halogen atoms.

5. The electrolyte according to claim 1, wherein is less than 10 mol % of the boron cluster salts comprise a single halogen atom.

6. The electrolyte according to claim 5, wherein at least 30 mol % of the boron cluster salts comprise two halogen atoms and at least 30 mol % of the boron cluster salts comprise three halogen atoms.

7. The electrolyte according to claim 6, wherein at least 1 mol % of the boron cluster salts comprise four halogen atoms.

8. The electrolyte according to claim 1, wherein greater than 0 mol % and less than or equal to 10 mol % of the boron cluster salts comprise two halogen atoms.

9. The electrolyte according to claim 1, wherein greater than 0 mol % and less than or equal to 10 mol % of the boron cluster salts comprise three halogen atoms.

10. The electrolyte according to claim 1, wherein greater than 0 mol % and less than or equal to 10 mol % of the boron cluster salts comprise four halogen atoms.

11. The electrolyte according to claim 1, wherein greater than 0 mol % and less than or equal to 10 mol % of the boron cluster salts are non-halogenated.

12. The electrolyte according to claim 1, wherein an anodic stability of the composite salt mixture and/or the halogenated boron cluster salt is at least 10% greater than an anodic stability of a parent halogen-free boron cluster salt.

13. The electrolyte according to claim 1, wherein the composite salt mixture and/or the halogenated boron cluster salt comprises a phase transition temperature between a non-superionic conducting phase and a superionic conducting phase transition that is less than a non-superionic conducting phase to superionic conducting phase transition temperature of a parent halogen-free boron cluster salt.

14. The electrolyte according to claim 13, wherein the phase transition temperature of the composite salt mixture and/or the halogenated boron cluster salt is at least 20° C. less than the non-superionic conducting phase to superionic conducting phase transition temperature of the parent halogen-free boron cluster salt.

15. The electrolyte according to claim 14, wherein the phase transition temperature for the composite salt mixture and/or the halogenated boron cluster salt is at least 30° C. less than the non-superionic conducting phase to superionic conducting phase transition temperature of the parent halogen-free boron cluster salt.

16. An electrolyte comprising:
a composite salt mixture comprising:
　a plurality of boron cluster salts comprising a halogenated boron cluster salt with a cation and a halogenated boron cluster anion, the cation selected from the group consisting of $Li^+$, $Na^+$, $Mg^{2+}$, $Ca^{2+}$, $Zn^{2+}$ and $Al^{3+}$, and the halogenated boron cluster anion having a structure of:

$[CB_{(y-1)}H_{(y-z-i)}R_zX_i]^-$, $[C_2B_{(y-2)}H_{(y-t-j-1)}R_tX_j]^-$, $[C_2B_{(y-3)}H_{(y-t-j)}R_tX_j]^-$, $[C_2B_{(y-3)}H_{(y-t-j-1)}R_tX_j]^{2-}$, $[C_2B_{(y-4)}H_{(y-t-j-1)}R_tX_j]^{2-}$, $[CB_{(y-1)}H_{(y-z)}R_z]^-$, $[C_2B_{(y-2)}H_{(y-t-1)}R_t]^-$, $[C_2B_{(y-3)}H_{(y-t)}R_t]^-$, $[C_2B_{(y-3)}H_{(y-t-1)}R_t]^{2-}$, or $B_yH_{(y-z-i)}R_zX_i]^{2-}$, wherein:
　y is an integer within a range of 6 to 12;
　(z+i) is an integer within a range of 0 to y;
　(t+j) is an integer within a range of 0 to (y−1);
　X is F, Cl, Br, or I; and
　R is:
　　(i) a linear, branched-chain, or cyclic C1-C18 alkyl or fluoroalkyl group;
　　(ii) a C6-C9 aryl or fluoroaryl group;
　　(iii) a linear, branched-chain, or cyclic C1-C8 alkoxy or fluoroalkoxy group;
　　(iv) a C6-C9 aryloxy or fluoroaryloxy group;
　　(v) amino; and
　　(vi) a substituent that combines two or more of (i)-(v);
wherein at least 90 mol % of the boron cluster salts comprise a single halogen atom.

17. The electrolyte according to claim 16, wherein an anodic stability of the composite salt mixture and/or the halogenated boron cluster salt is at least 10% greater than an anodic stability of a parent halogen-free boron cluster salt.

18. The electrolyte according to claim 16, wherein:
greater than 0 mol % and less than or equal to 10 mol % of the boron cluster salts are non-halogenated, and greater than 0 mol % and less than or equal to 10 mol % of the boron cluster salts comprise two halogen atoms;
greater than 0 mol % and less than or equal to 10 mol % of the boron cluster salts comprise three halogen atoms; and
greater than 0 mol % and less than or equal to 10 mol % of the boron cluster salts comprise four halogen atoms; or
any combination thereof.

19. An electrochemical cell comprising:

an anode selected from the group consisting of an alkaline anode, an alkaline earth anode, an insertion anode, a conversion anode, and an organic anode;

a cathode selected from the group consisting of a metal halide cathode, an air cathode, an organic cathode, an insertion cathode, and a conversion cathode; and an electrolyte with a composite salt mixture comprising:

a plurality of boron cluster salts comprising a halogenated boron cluster salt with a cation and a halogenated boron cluster anion, the cation selected from the group consisting of $Li^+$, $Na^+$, $Mg^{2+}$, $Ca^{2+}$, $Zn^{2+}$ and $Al^{3+}$, and the halogenated boron cluster anion having a structure of:

$[CB_{(y-1)}H_{(y-z-i)}R_zX_i]^-$, $[C_2B_{(y-2)}H_{(y-t-j-1)}R_tX_j]^-$, $[C_2B_{(y-3)}H_{(y-t-j)}R_tX_j]^-$, $[C_2B_{(y-3)}H_{(y-t-j-1)}R_tX_j]^{2-}$, $[C_2B_{(y-4)}H_{(y-t-j-1)}R_tX_j]^{2-}$, $[CB_{(y-1)}H_{(y-z)}R_z]^-$, $[C_2B_{(y-2)}H_{(y-t-1)}R_t]^-$, $[C_2B_{(y-3)}H_{(y-t)}R_t]^-$, $[C_2B_{(y-3)}H_{(y-t-1)}R_t]^{2-}$, or $B_yH_{(y-z-i)}R_zX_i]^{2-}$, wherein:

y is an integer within a range of 6 to 12;

(z+i) is an integer within a range of 0 to y;

(t+j) is an integer within a range of 0 to (y−1);

X is F, Cl, Br, or I; and

R is:

(i) a linear, branched-chain, or cyclic C1-C18 alkyl or fluoroalkyl group;

(ii) a C6-C9 aryl or fluoroaryl group;

(iii) a linear, branched-chain, or cyclic C1-C8 alkoxy or fluoroalkoxy group;

(iv) a C6-C9 aryloxy or fluoroaryloxy group;

(v) amino; and (vi) a substituent that combines two or more of (i)-(v);

wherein less than 10 mol % of the boron cluster salts comprise a single halogen atom.

20. The electrochemical cell according to claim 19, at least 30 mol % of the boron cluster salts comprise two halogen atoms and at least 30 mol % of the boron cluster salts comprise three halogen atoms.

* * * * *